（12）United States Patent
Cui (10) Patent No.: US 12,555,563 B2
(45) Date of Patent: Feb. 17, 2026

(54) SYSTEMS AND METHODS FOR CHARACTER-TO-PHONE CONVERSION

(71) Applicant: TENCENT AMERICA LLC, Palo Alto, CA (US)

(72) Inventor: Jia Cui, Bellevue, WA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 600 days.

(21) Appl. No.: 17/888,243

(22) Filed: Aug. 15, 2022

(65) Prior Publication Data

US 2024/0054989 A1    Feb. 15, 2024

(51) Int. Cl.
*G10L 13/047* (2013.01)
*G06F 40/284* (2020.01)

(52) U.S. Cl.
CPC .......... *G10L 13/047* (2013.01); *G06F 40/284* (2020.01)

(58) Field of Classification Search
CPC ..... G10L 13/047; G10L 13/08; G06F 40/284; G06F 40/30; G06F 40/295
USPC ........................................................ 704/260
See application file for complete search history.

(56) References Cited

U.S. PATENT DOCUMENTS

| | | | |
|---|---|---|---|
| 2008/0091428 A1 | 4/2008 | Bellegarda | |
| 2015/0019463 A1* | 1/2015 | Simard | G06F 40/30 706/12 |
| 2021/0183392 A1 | 6/2021 | Lee et al. | |
| 2022/0165249 A1 | 5/2022 | Wu et al. | |

FOREIGN PATENT DOCUMENTS

WO    2022/043712 A1    3/2022

OTHER PUBLICATIONS

Haiteng Zhang et al. A Mask-based Model for Mandarin Chinese Polyphone Disambiguation (Year: 2020).*
Tomoya Yanagita, et al. ("Neural iTTS: Toward Synthesizing Speech in Real-time with End-to-end Neural Text-to-Speech Framework") (Year: 2019).*
Yi Shi, et al., "Polyphone Disambiguition in Mandarin Chinese with Semi-Supervised Learning", arXiv:2102.00621v2 [cs.CL], Jul. 3, 2021 (5 pages).
International Search Report dated Dec. 13, 2023 issued by the International Searching Authority in counterpart International Application No. PCT/US2023/028758.
Written Opinion dated Dec. 13, 2023 issued by the International Searching Authority in Application No. PCT/US2023/028758.

* cited by examiner

*Primary Examiner* — Paras D Shah
*Assistant Examiner* — Fouzia Hye Solaiman
(74) *Attorney, Agent, or Firm* — Sughrue Mion, PLLC (57) ABSTRACT

Systems and methods for training a model to perform end-to-end character-to-phoneme (C2P) conversion include: selecting a plurality of unlabeled sentences from a first data source, selecting a plurality of labeled sentences from a second data source, preprocessing a combined corpus of the selected unlabeled and labeled sentences to extract a plurality of linguistic features, generating mixed training data by automatically labeling tokens in the preprocessed corpus based on the plurality of extracted linguistic features, and training a pre-trained model, using the mixed training data, to perform end-to-end C2P conversion.

16 Claims, 6 Drawing Sheets

(PRIOR ART)

SYSTEMS AND METHODS FOR CHARACTER-TO-PHONE CONVERSION

1. FIELD

Apparatuses and methods consistent with example embodiments of the present disclosure relate to text analysis for text-to-speech synthesis, and more particularly to grapheme to phoneme conversion of Mandarin text (i.e., characters) to pinyin sequences.

2. BACKGROUND

Grapheme-to-phoneme (G2P) conversion is a major step in text to speech (TTS) synthesis. For some languages (e.g., English), a G2P dictionary contains enough information to create a solid baseline for real-world applications. For Mandarin, this process is much more complicated because of a high ratio of polyphones and frequent tone changes. For example, Mandarin has 546 out of 8507 most common characters defined as polyphones, which contribute 29% of token occurrences in Mandarin text. Since different phonemes usually represent different meanings, disambiguating polyphone characters is a key component for the intelligibility of speech synthesis.

The special phenomena in Mandarin pronunciation called tone change presents an additional challenge. Determining at which position in the text (at which characters) a tone change occurs depends on word boundaries as well as semantic meaning based on the context. Moreover, Mandarin includes special characters which are not annotated as polyphone in dictionaries but have context-dependent tone changes. All together tone changes contribute nearly 6% of token occurrences in Mandarin text. Handling the tone variation is therefore essential for naturalness of synthesized results.

3. DESCRIPTION OF RELATED ART

In the traditional pipeline, an input text is first preprocessed to obtain linguistic features such as word boundaries, part-of-speech (POS) tags, etc. The information on linguistic features as well as pre-defined dictionaries are necessary inputs for rule-based character-to-pinyin systems and some model-based character-to-pinyin systems. These systems also handle polyphones and tone changes individually, without considering contextual semantic information that may be relevant.

In some special cases, a word-based dictionary and linguistic labels are good enough for polyphone disambiguation. For example, the words "率 shuai4领" and "效率 lv4" are uniquely defined, given a correct word boundary annotation result. However, some cases are more challenging, such as "都;喜欢住在大都会的人大都会理解". Another special case for Mandarin pronunciation is the 3-3 tone change: for a sequence of continuous tone-3 characters, some of them should be pronounced as tone-2. For example, in the sequence "我可以理解你只想李敏敏给你选眼影" all the characters are tone-3, however the correct tone pronunciation is "3232332332323323". Traditionally, the 3-3 tone change is handled by rule-based systems, which require preprocessing to identify word boundary and part of speech tag information.

The traditional rule-based systems for character-to-pinyin conversion may cover some cases with high precision, but are difficult to scale up. Current decision tree and neural network (NN) models focus only on a subset of polyphone characters with limited training data. Recent statistical model-based systems for disambiguating polyphones are usually supervised models and require a large amount of annotated data which is very expensive to acquire.

SUMMARY

According to various embodiments, systems and methods are provided for training a model to perform end-to-end character-to-phoneme (C2P) conversion, and for performing end-to-end C2P conversion.

According to aspects of one or more example embodiments, a method for training a model to perform end-to-end character-to-phoneme (C2P) conversion, performed by at least one processor, includes: selecting a plurality of unlabeled sentences from a first data source, selecting a plurality of labeled sentences from a second data source, preprocessing a combined corpus of the selected unlabeled and labeled sentences to extract a plurality of linguistic features, generating mixed training data by automatically labeling tokens in the preprocessed corpus based on the plurality of extracted linguistic features, and training a pre-trained model, using the mixed training data, to perform end-to-end C2P conversion.

The method of selecting the plurality of unlabeled sentences from the first data source may include selecting at least one sentence, from the plurality of unlabeled sentences, that includes a target polyphone character, for each of a plurality of target polyphone characters.

The method of selecting the plurality of unlabeled sentences from the first data source may include selecting a sentence, from the plurality of unlabeled sentences, only once for each of a plurality of target polyphone characters, and selecting at least a predetermined minimum number of sentences, from the plurality of unlabeled sentences, for each of the plurality of target polyphone characters.

The method of preprocessing the combined corpus of the selected unlabeled and labeled sentences to extract a plurality of linguistic features may include identifying one or more of a word boundary, part-of-speech (POS) tag, or named entity phrase using one or more linguistic tools, and extracting each identified word boundary, POS tag, or named entity phrase as a linguistic feature.

The method of preprocessing the combined corpus of the selected unlabeled and labeled sentences to extract a plurality of linguistic features may include identifying one or more tokens of the combined corpus that are associated with an extracted linguistic feature and a manually-labeled linguistic feature, wherein the extracted and manually-labeled linguistic features are mismatched, and masking the mismatched extracted linguistic feature associated with each of the one or more identified tokens.

The method of generating mixed training data by automatically labeling tokens in the preprocessed corpus based on the plurality of extracted linguistic features may include inputting the preprocessed corpus to a baseline system for automatic labeling, wherein the baseline system includes a plurality of rules and decision trees configured to label one or more tokens in the preprocessed corpus, obtaining a plurality of labeled tokens, output by the baseline system in response to inputting the preprocessed corpus, each token corresponding to a character in the preprocessed corpus, and each label corresponding to a phoneme associated with the character, and mixing the plurality of labeled tokens.

The method of mixing the plurality of labeled tokens may include identifying a mismatch among the plurality of labeled tokens, between an automatically generated label associated with a token and a manually assigned label associated with a token, and converting the mismatched automatically generated label to be consistent with the manually assigned label.

The method of training the pre-trained model, using the mixed training data, to perform end-to-end C2P conversion may include obtaining the pre-trained model that is previously trained to perform C2P conversion, and retraining the pre-trained model, using the mixed training data, to simultaneously label all characters in an input sentence when performing C2P conversion on the input sentence.

According to aspects of one or more example embodiments, a method for performing end-to-end character-to-phoneme (C2P) conversion, may include: receiving text including a sequence of characters, inputting the text to a skC2P model, obtaining a plurality of tokens including labeled tokens and unlabeled tokens, as an output of the skC2P model in response to the input text, each of the labeled tokens corresponding to a polyphonic character in the input text, post-processing the plurality of tokens to label the unlabeled tokens, such that each token in the post-processed plurality of tokens is associated with a label, and outputting the post-processed plurality of tokens.

The skC2P model may be a modified BERT model and includes a modified top layer of the BERT model, and the skC2P model may be pre-trained to perform end-to-end C2P conversion without preprocessing the input text. The modified top layer of the BERT model provides an output of a BertSelfOutput module to a gather module, and an output of the gather module to a classification module to perform a classification on only selected tokens in the input text. The skC2P model may be a one-layer model.

According to aspects of one or more example embodiments, an electronic device may include: at least one memory configured to store computer program code, and at least one processor configured to operate as instructed by the computer program code, the computer program code including: selecting code configured to cause the at least one processor to select a plurality of unlabeled sentences from a first data source, and select a plurality of labeled sentences from a second data source, preprocessing code configured to cause the at least one processor to preprocess a combined corpus of the selected unlabeled and labeled sentences to extract a plurality of linguistic features, generating code configured to cause the at least one processor to generate mixed training data by automatically labeling tokens in the preprocessed corpus based on the plurality of extracted linguistic features, and training code configured to cause the at least one processor to train a pre-trained model, using the mixed training data, to perform end-to-end C2P conversion.

The selecting code is configured to cause the at least one processor to: select a sentence, from the plurality of unlabeled sentences, only once for each of a plurality of target polyphone characters, and select at least a predetermined minimum number of sentences, from the plurality of unlabeled sentences, for each of the plurality of target polyphone characters.

The preprocessing code is configured to cause the at least one processor to: identify one or more of a word boundary, part-of-speech (POS) tag, or named entity phrase using one or more linguistic tools, and extract each identified word boundary, POS tag, or named entity phrase as a linguistic feature.

The generating code is configured to cause the at least one processor to: input the preprocessed corpus to a baseline system for automatic labeling, wherein the baseline system includes a plurality of rules and decision trees configured to label one or more tokens in the preprocessed corpus, obtain a plurality of labeled tokens, output by the baseline system in response to inputting the preprocessed corpus, each token corresponding to a character in the preprocessed corpus, and each label corresponding to a phoneme associated with the character, and mix the plurality of labeled tokens.

The training code is configured to cause the at least one processor to: obtain the pre-trained model that is previously trained to perform C2P conversion, and retrain the pre-trained model, using the mixed training data, to simultaneously label all characters in an input sentence when performing C2P conversion on the input sentence.

The electronic device may further include computer program code configured to cause the at least one processor to: perform end-to-end C2P conversion using the trained model trained on the mixed training data The electronic device may further include computer program code configured to cause the at least one processor to: perform end-to-end C2P conversion in real-time, using the trained model to output a sequence of phonemes corresponding to an input sequence of characters.

According to aspects of one or more example embodiments, a non-transitory computer-readable medium having recorded thereon a computer program which, when executed by a processor, causes the processor to select a plurality of unlabeled sentences from a first data source, select a plurality of labeled sentences from a second data source, preprocess a combined corpus of the selected unlabeled and labeled sentences to extract a plurality of linguistic features, generate mixed training data by automatically labeling tokens in the preprocessed corpus based on the plurality of extracted linguistic features, and train a pre-trained model, using the mixed training data, to perform end-to-end C2P conversion.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

As set forth above, the related art includes rule-based and model-based systems for grapheme-to-phoneme (G2P) conversion. These systems handle polyphones and tone changes individually, without considering contextual semantic information that may be relevant, require preprocessing to obtain linguistic features, only focus on a subset of polyphone characters, are difficult to scale up, and/or require a large amount annotated data which is expensive to acquire.

Example embodiments provide a system and method that perform end-to-end annotation in real-time of all characters without an extra labeling preprocess. For instance, the system and method may perform character to phoneme (e.g., pinyin) conversion by using a knowledge-transfer character-to-phone (kC2P) pipeline to transfer knowledge from previously built rule-based or model-based systems into a unified neural network (NN) model through a large amount of unlabeled data. In this way, the unified NN model is pre-trained with simple linguistic knowledge to enable the final (trained) model to perform end-to-end without requiring additional linguistic knowledge. By learning from previously built models, the unified NN model reduces annotation cost. Additionally, the unified NN model may be modified to create a one-layer model having a new structure, which can achieve faster performance than the traditional systems, which is key for real-time conversion (e.g., for a streaming TTS application).

According to an aspect of the disclosure, the unified NN model with the kC2P pipeline integrates knowledge from rule-based systems (e.g., man-made rules) and model-based systems (e.g., decision tree models, statistical models). By annotating a large amount of corpus with the rule-based systems (rules) and model-based systems (teacher models), the unified NN model (student model) may learn the context dependency of the phoneme choices. Moreover, because the unified NN model is pre-trained on a large corpus to learn the semantic/linguistic dependencies, the model may combine hidden semantic/syntactic information with the phoneme annotation task, thereby avoiding preprocessing during inference and allowing a one-step character-to-phone annotation.

According to an aspect of the disclosure, to prepare for knowledge transfer, a sufficient amount of unlabeled sentences are selected. This may be done by selecting the sentences from a general domain language model (LM) corpus. Each selected sentence may be targeted to one polyphone character, and each polyphone character may be targeted by about 2000 sentences. Additionally, each sentence may be selected only once. The selection may be performed in loops (e.g., four loops), with frequent phrases having priority while including as many different contexts as possible for the target character.

The selected sentences (unlabeled corpus) is then combined with a labeled corpus (e.g., manually labeled corpus). The combined corpus (unlabeled corpus and labeled corpus) are preprocessed (e.g., by using linguistic tools) to obtain linguistic features such as word boundaries, part-of-speech (POS) tags, and named entity phrases. In some implementations, if there is a mismatch between linguistic features corresponding to the manual labels of the labeled corpus and the linguistic features of the labeled corpus identified by the linguistic tools, then the linguistic features identified by the linguistic tools may be converted or masked such that the linguistic features of the combined corpus are consistent.

The preprocessed corpus may be input to a baseline system. The baseline system may be composed with rules and multiple decision trees, for character-to-phoneme conversion. In this way, all tokens (e.g., characters) in the combined corpus are automatically labeled, except for tokens that were manually labeled. The manually labeled tokens may retain their original labels. In some implementations, if there is mismatch between the automatically generated labels for the unlabeled corpus and the manually assigned labels for the labeled corpus, then the mismatched automatically generated labels may be converted such that the labels of the combined corpus are consistent. The automatically labeled tokens may be combined and mixed with the tokens of the labeled corpus, before being output by the kC2P pipeline. The output of the kC2P pipeline may be used to train a pre-trained BERT model to label all characters in a sentence simultaneously.

According to an aspect of the disclosure, in order to increase inference speed, a new one-layer BERT structure (sBERT) is created for sequence labeling. This simple one-layer of BERT may contain enough pre-trained information for polyphone annotation, and yield better performance than the baseline system. This structure may also be applied to other sparse sequence labeling problems where only a subset of units are targeted.

According to an aspect of the disclosure, a layer (e.g., top BERT layer) of the pre-trained BERT model may be modified to create the sBERT layer. The modified model with the sBERT layer is referred to as skC2P, and the skC2P model may be trained to label all characters in a sentence simultaneously using the output of the kC2P pipeline as training data for the skC2P model. The trained skC2P model may be used for sequence labeling.

The sBERT layer may be created by removing the modules "BertIntermediate" and "BertOutput" from the original top layer of the pre-trained BERT model (original layer). By removing these modules, the layer may be simplified without hurting the model performance. Additionally, a "Gather" operation may be added before a classifier module of the original layer. The "Gather" operation enables the skC2P model to only label select characters, since most characters which are monophonic without phoneme or tone variations may be labeled directly with a dictionary. In this way, computational time may be reduced. Additionally, in an attention component of the original layer, a vector size of the key and query components of the original layer is reduced, and another "Gather" operation is added before the query component. In this way, a length of an input sequence (L) is shortened, and computational time is significantly reduced from $L*L*N$ to $(r*L)*L*N$ where r is the ratio of targeted characters in a sentence and N is the query vector dimension. These modifications together create the sBERT layer, and enable the skC2P model to speed up inference without much performance loss.

According to an aspect of the disclosure, an output of the model may be post-processed to label characters that were excluded by the model. For example, the monophonic characters without phoneme or tone variations may be labeled during the post-processing with input from a dictionary. In some implementations, the post-processing may be performed by a post-processing module that is wrapped with the dictionary input into a python module.

According to an aspect of the disclosure, the trained model may be compressed. For example, Libtorch with quantization may be used to decrease the model size.

Figure 1:
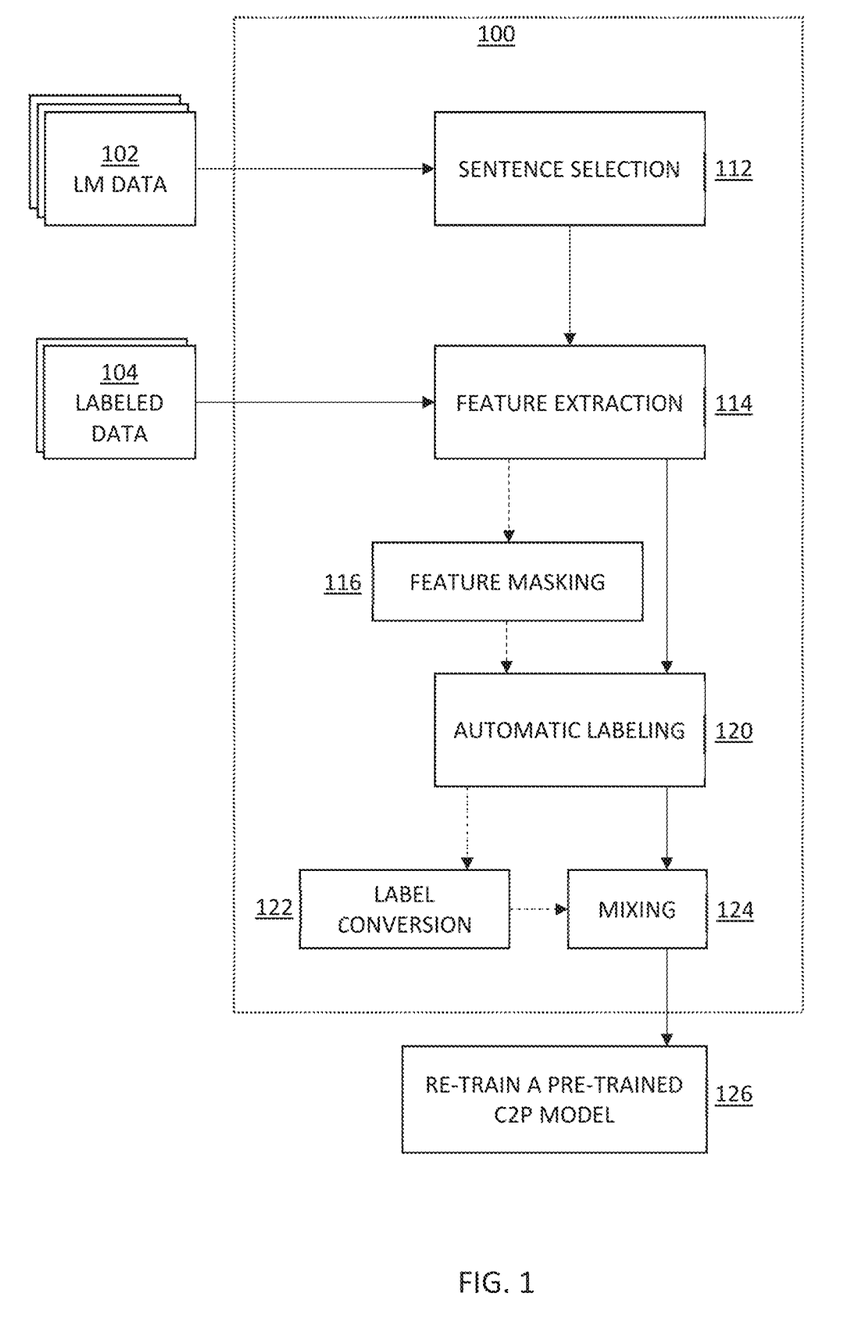
FIG. 1 illustrates a knowledge-transfer character-to-phone (kC2P) pipeline, according to various embodiments.

FIG. 1 illustrates a knowledge-transfer character-to-phone (kC2P) pipeline 100, according to various embodiments. As shown in FIG. 1, at 112, the kC2P pipeline 100 includes selecting a plurality of unlabeled sentences from language model (LM) data 102. The LM data 102 may include a general domain language model corpus. Each of the plurality of unlabeled sentences selected from LM data 102 may be targeted to a polyphone character. For example, a selected sentence may be targeted to a polyphone character if the selected sentence includes the polyphone character. In some implementations, each polyphone character may be targeted by 2000 unlabeled sentences from LM data 102, or thereabout. For example, a first polyphone character may be targeted by exactly 2000 unlabeled sentences, a second polyphone character may be targeted by fewer than 2000 unlabeled sentences, and a third polyphone character may be targeted by more than 2000 unlabeled sentences. In some implementations, each unlabeled sentence in LM data 102 may be selected only once for each polyphone character. In some implementations, each unlabeled sentence in LM data 102 may be selected only once for any polyphone character. In some implementations, the selection may be performed in loops (e.g., four loops), with frequent phrases having priority while including as many different contexts as possible for a target character.

At 114, the kC2P pipeline 100 includes obtaining features extracted from the unlabeled sentences selected from LM data 102 and labeled sentences from labeled data 104. In some implementations, the labeled sentences from labeled data 104 are manually-labeled or hand-labeled. The unlabeled sentences and labeled sentences may be combined to create a combined corpus. The combined corpus may be preprocessed to extract linguistic features from the unlabeled and labeled sentences. For example, one or more linguistic tools may be used to extract the linguistic features from the unlabeled and labeled sentences of the combined corpus. The extracted linguistic features may include, for example, word boundaries, part-of-speech (POS) tags, named entity phrases, or other features useful for performing G2P conversion. The preprocessed combined corpus may be provide as input to a baseline system for automatic labeling.

At 116, if there is a mismatch between linguistic features corresponding to the manual labels of the labeled sentences and the linguistic features of the labeled sentences identified by the linguistic tools, then the linguistic features identified by the linguistic tools may be converted or masked such that the linguistic features of the combined corpus are consistent. The preprocessed combined corpus (with consistent linguistic features across the labeled and unlabeled sentences) may be provide as input to the baseline system for automatic labeling.

At 118, the kC2P pipeline 100 includes automatically labelling the preprocessed combined corpus. For example, the preprocessed combined corpus may be input to the baseline system for automatic labeling, that will output automatically generated labels for the provided input. The baseline system may be, for example, a plurality of rules and decision trees for character-to-phoneme conversion. The baseline system may automatically label all tokens in the preprocessed combined corpus. The kC2P pipeline 100 may output the automatically generated labels for the preprocessed combined corpus. For example, the kC2P pipeline 100 may output a plurality of tokens corresponding to the labeled and unlabeled sentences of the combined corpus (or the words in the labeled and unlabeled sentences) and an automatically generated label for each of the tokens.

In some implementations, the baseline system may automatically label only the unlabeled sentences of the combined corpus, so that the labeled sentences retain their manually labeled labels. For example, the kC2P pipeline 100 may output a plurality of tokens corresponding to the labeled and unlabeled sentences of the combined corpus (or the words in the labeled and unlabeled sentences), an automatically generated label for each token corresponding to an unlabeled sentence, and a manually assigned label for each token corresponding to a labeled sentence.

At 122, if there is a mismatch between the automatically generated labels for the unlabeled sentences and the manually assigned labels for the labeled sentences, then the kC2P pipeline 100 includes converting the mismatched automatically generated labels such that the labels of the combined corpus are consistent.

At 124, the kC2P pipeline 100 includes combining and mixing the automatically labeled tokens (of the unlabeled sentences selected from LM data 102) with the manually labeled tokens (of the labeled sentences from labeled data 104), before being output by the kC2P pipeline 100.

At 126, the output of the kC2P pipeline 100 may be used to train (re-train) a model that is pre-trained to perform character-to-phoneme conversion. For example, the output of the kC2P pipeline may be used as training data for a pre-trained C2P model. The pre-trained C2P model may be previously trained to perform character-to-phoneme conversion. The output of the kC2P pipeline 100 may be used to train the pre-trained C2P model to label all characters in a sentence simultaneously. The pre-trained C2P model may be a modified top layer of a pre-trained BERT model (e.g., skC2P model).

Figure 2:
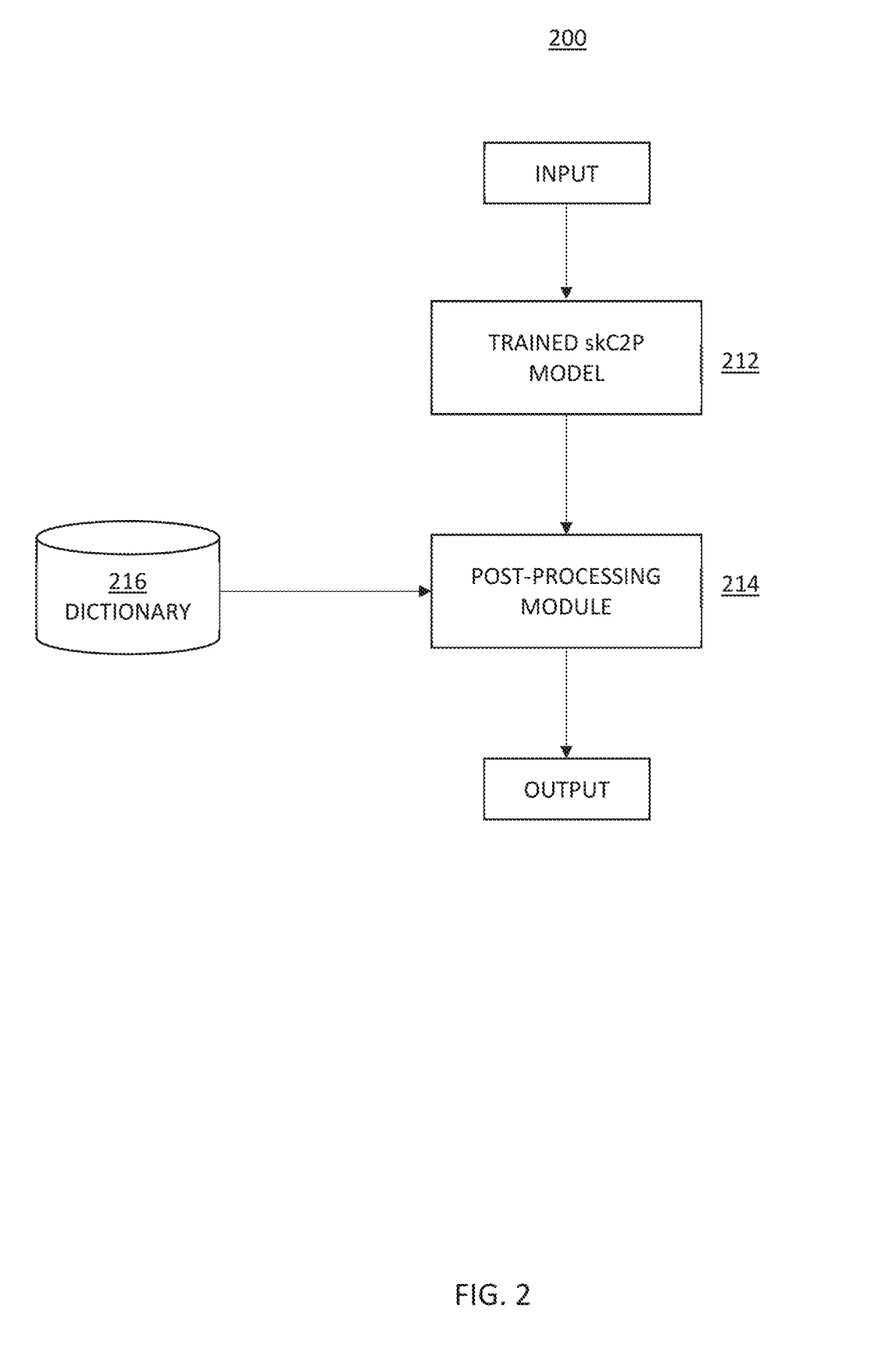
FIG. 2 illustrates a flow diagram for sequence labeling using a model trained to label all characters in a sentence simultaneously, according to various embodiments.

FIG. 2 illustrates a flow diagram 200 for sequence labeling using a model trained to label all characters in a sentence simultaneously, according to various embodiments. The trained model may be, for example, a modified pre-trained BERT model (e.g., skC2P model) that is trained on an output of the kC2P pipeline 100 to label all characters in a sentence simultaneously. At 212, the flow diagram 200 includes providing an input to a skC2P model that is trained to label all characters in a sentence simultaneously. The skC2P model may be trained on an output of the kC2P pipeline 100. The input to the trained skC2P model may include a sequence of text including Mandarin characters, and in response to providing the input to the trained skC2P model, the trained skC2P model may output a plurality of annotated (labeled) tokens. The trained skC2P model may output a subset of tokens of the input to the skC2P model. For example, the skC2P model may output a plurality of annotated tokens corresponding to polyphonic characters of the input to the skC2P model. The trained skC2P model may provide the output based on the input in real-time without an extra labeling process.

At 214, the flow diagram 200 may include post-processing the output of the trained skC2P model. For example, the output of the trained skC2P model may be post-processed to label characters that were excluded by the model, such as monophonic characters without phoneme or tone variations. The monophonic characters may be labeled during the post-processing with input from a dictionary 216. In some implementations, the post-processing may be performed by a post-processing module that is wrapped with input of dictionary 216 into a python module.

Figure 3:
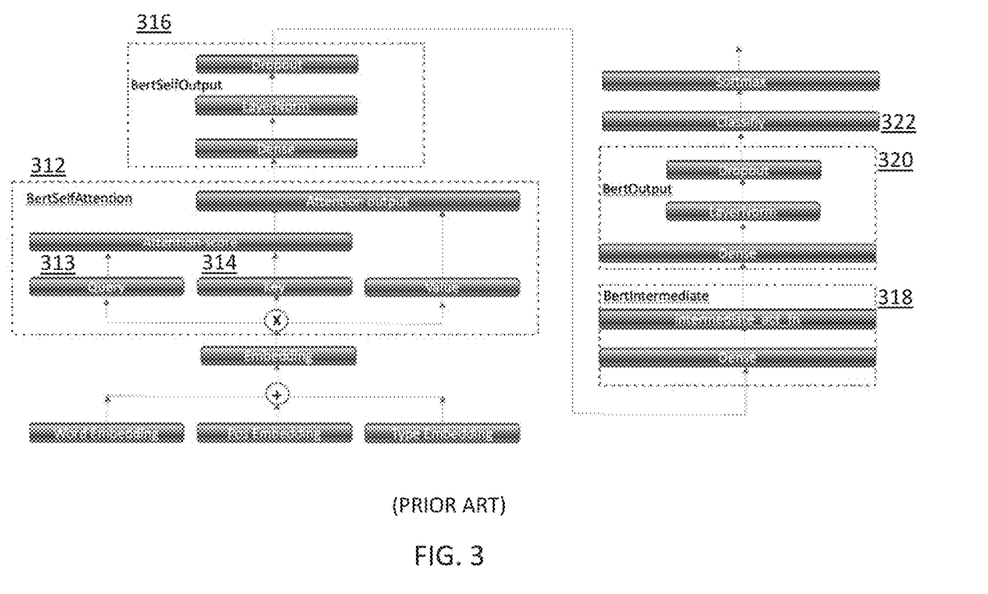
FIG. 3 illustrates a top layer structure of a pre-trained BERT model.

FIG. 3 illustrates a top layer structure of a pre-trained BERT model. The top layer structure of the pre-trained BERT model (original layer) may include a BertSelfAttention module 312, a BertSelfOutput module 316, a BertIntermediate module 318, a BertOutput module 320, and classifier 322. The BertSelfAttention module may include a query module 313 and a key module 314.

Figure 4:
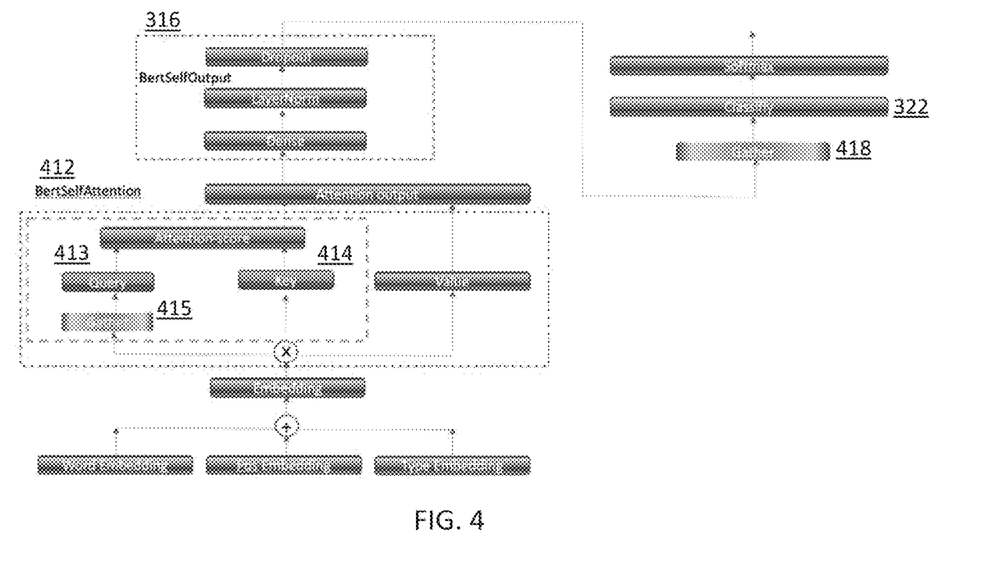
FIG. 4 illustrates a sBERT layer of a skC2P model, according to various embodiments.

FIG. 4 illustrates a sBERT layer 400 of a sKC2p model, according to various embodiments. The sBERT layer may be created by modifying the top layer structure of the pre-trained BERT model (shown in FIG. 3). As shown in FIG. 4, the BertIntermediate module 316, and BertOutput module 318 may be removed to create sBERT layer 400. By removing these modules, the sBERT layer 400 may be simplified without hurting the skC2P model performance.

As shown in FIG. 4, a Gather module 418 may be added before the classifier module 322. The Gather module 418 may enable the skC2P model to only label select characters (e.g., polyphonic characters) since most characters which are monophonic without phoneme or tone variations may be labeled directly with a dictionary.

As shown in FIG. 4, the BertSelfAttention module 312 of the original layer may be modified to create BertSelfAttention module 412. In BertSelfAttention module 412, a vector size of the query module 413 and key module 414 are reduced, with respect to the query module 313 and key module 314. Additionally, in BertSelfAttention module 412, a Gather module 415 is added before the query module 413. In this way, a length of an input sequence (L) is shortened, and computational time is significantly reduced from $L*L*N$ to $(r*L)*L*N$ where r is the ratio of targeted characters in a sentence and N is the query vector dimension. These modifications together create the sBERT layer 400, and enable the skC2P model to speed up inference without much performance loss.

Figure 5:
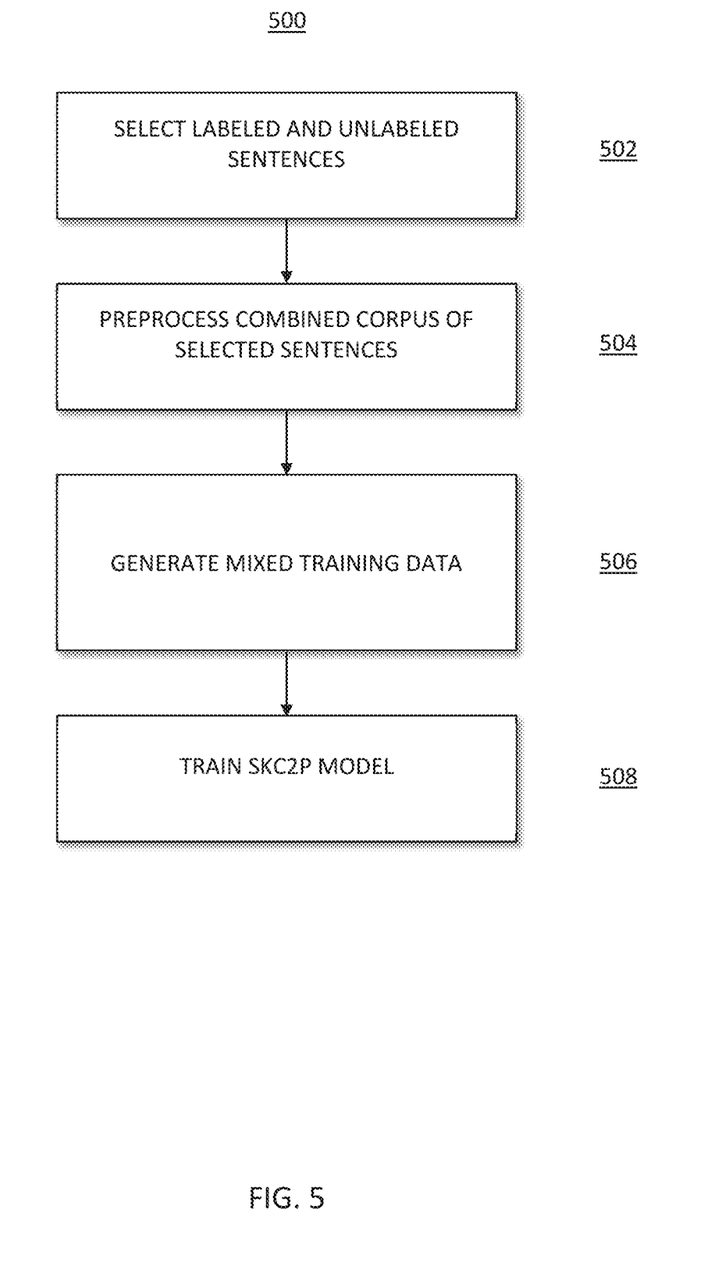
FIG. 5 illustrates a method for training a model to perform end-to-end C2P conversion, according to various embodiments.

FIG. 5 illustrates a method 500 for training a model to perform end-to-end C2P conversion, according to various embodiments. Referring to FIG. 5, at 502, the method 500 includes selecting labeled and unlabeled sentences. For example, a plurality of unlabeled sentences may be selected from a first data source and a plurality of labeled sentences may be selected from a second data source. In some implementations, at least one sentence that includes a target polyphone character may be selected from the plurality of unlabeled sentences, for each of a plurality of target polyphone characters. In some implementations, a sentence may be selected from the plurality of unlabeled sentences only once for each of a plurality of target polyphone characters, and at least a predetermined minimum number of sentences may be selected from the plurality of unlabeled sentences, for each of the plurality of target polyphone characters.

At 504, the method 500 includes preprocessing a combined corpus of the selected sentences. For example, a combined corpus of the selected unlabeled and labeled sentences may be preprocessed to extract a plurality of linguistic features. The preprocessing may include identifying one or more of a word boundary, POS tag, or named entity phrase using one or more linguistic tools, and extracting each identified word boundary, POS tag, or named entity phrase as a linguistic feature. In some implementations, if one or more tokens of the combined corpus that are associated with an extracted linguistic feature are mismatched with a manually-labeled linguistic feature, then the mismatched extracted linguistic feature associated with each of the one or more identified tokens may be masked.

At 506, the method 500 includes generating mixed training data. The mixed training data may be generated by, for example, automatically labelling tokens in the preprocessed corpus based on the plurality of extracted linguistic features. The preprocessed corpus may be automatically labelled by inputting the preprocessed corpus to a baseline system for automatic labeling. The baseline system may include a plurality of rules and decision trees configured to label one or more tokens in the preprocessed corpus. A plurality of labeled tokens may be obtained as an output by the baseline system in response to inputting the preprocessed corpus, where each token corresponds to a character in the preprocessed corpus, and each label corresponds to a phoneme associated with the character. The plurality of labeled tokens may be mixed to generate the mixed training data. In some implementations, before mixing the plurality of labeled tokens, a mismatch may be identified among the plurality of labeled tokens, between an automatically generated label associated with a token and a manually assigned label associated with a token, and the mismatched automatically generated label may be converted to be consistent with the manually assigned label.

At 508, the method 500 includes training a skC2P model. For example, the skC2P model may be a pre-trained model, and may be trained, using the generated mixed training data, to simultaneously label all characters in a sentence when performing C2P conversion. The obtained pre-trained model may be previously trained to perform C2P conversion, and the training may include retraining the pre-trained model, using the mixed training data, to simultaneously label all characters in a sentence when performing C2P conversion. Training the pre-trained model may include obtaining the pre-trained model that is previously trained to perform C2P conversion, and retraining the pre-trained model, using the mixed training data, to simultaneously label all characters in an input sentence when performing C2P conversion on the input sentence.

Figure 6:
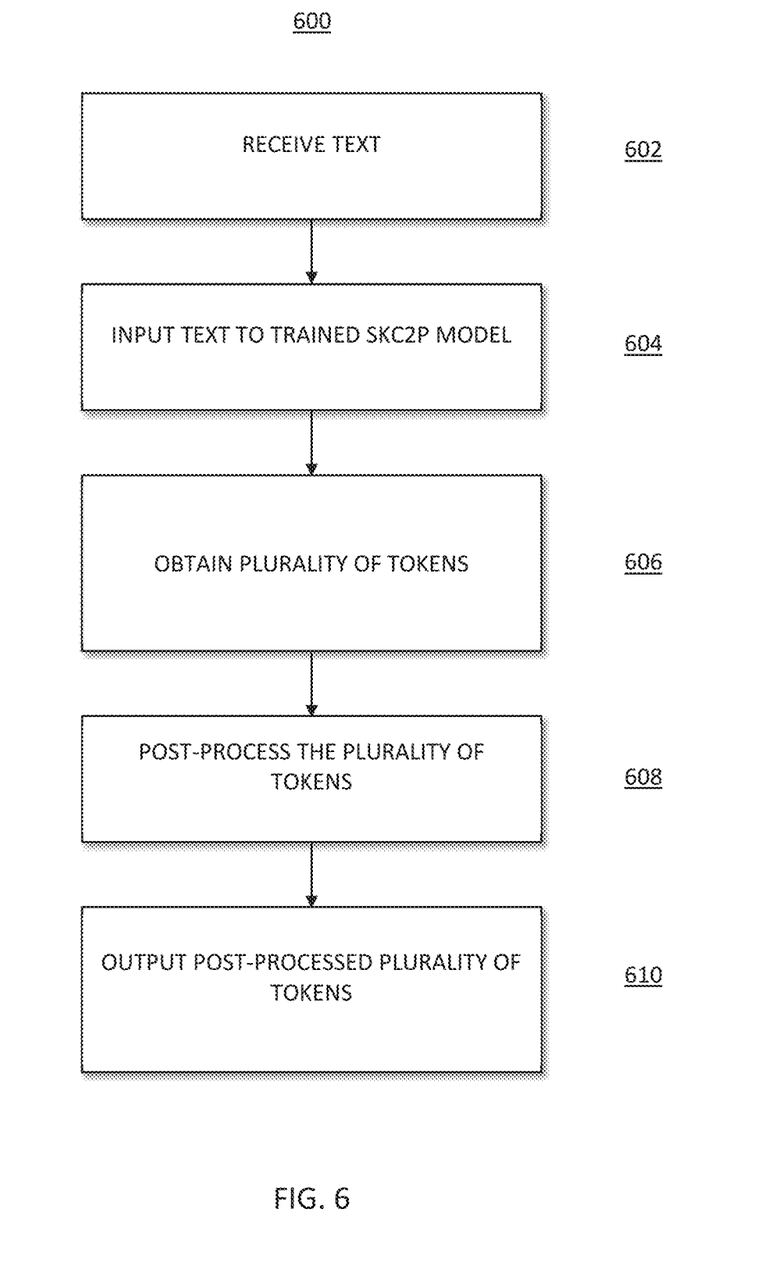
FIG. 6 illustrates a method for performing end-to-end C2P conversion, according to various embodiments.

FIG. 6 illustrates a method 600 for performing end-to-end C2P conversion, according to various embodiments. Referring to FIG. 6, at 602, the method 600 includes receiving text including a sequence of characters. For example, the text may include a sequence of Mandarin characters.

At 604, the method 600 includes inputting the text to a skC2P model. The skC2P model may be a modified BERT model and includes a modified top layer of the BERT model, and may be pre-trained to perform end-to-end C2P conversion without preprocessing the input text. The modified top layer of the BERT model may be modified such that the modified layer provides an output of a BertSelfOutput module to a gather module, and an output of the gather module to a classification module to perform a classification on only selected tokens in the input text. For example, the modified layer may perform C2P conversion on only tokens in the input text that correspond to polyphonic characters. The skC2P model may be a one-layer model. For example, the skC2P model may include the modified top layer of the BERT model (sBERT) as the one layer.

At 606, the method 600 includes obtaining a plurality of tokens including labeled tokens and unlabeled tokens, as an output of the skC2P model in response to the input text, each of the labeled tokens corresponding to a polyphonic character in the input text.

At 608, the method 600 includes post-processing the plurality of tokens to label the unlabeled tokens so that each token in the post-processed plurality of tokens is associated with a label.

At 610, the method 600 includes outputting the post-processed plurality of labeled tokens. For example, the post-processed plurality of labeled tokens may each identify a phoneme corresponding to an input character, and the post-processed plurality of labeled tokens may be output as a sequence of phonemes corresponding to an input sequence of characters.

Figure 7:
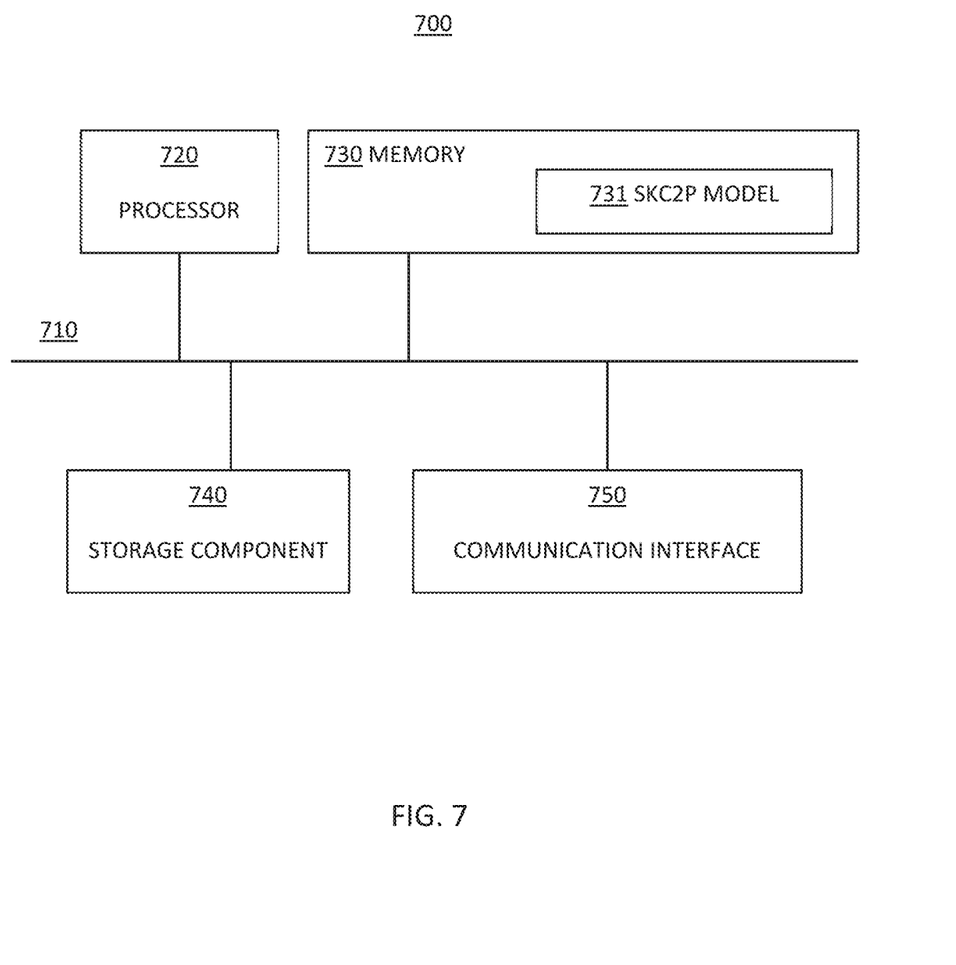
FIG. 7 illustrates a diagram of components of one or more devices, according to various embodiments.

FIG. 7 illustrates a diagram of components of one or more devices, according to various embodiments. Referring to FIG. 7, the device 700 may include a bus 710, a processor 720, a memory 730, a storage component 740, and a communication interface 750. It is understood that one or more of the components may be omitted and/or one or more additional components may be included.

The bus 710 includes a component that permits communication among the components of the device 700. The processor 720 is implemented in hardware, firmware, or a combination of hardware and software. The processor 720 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor 720 includes one or more processors capable of being programmed to perform an operation.

The memory 730 includes a random access memory (RAM), a read only memory (ROM), and/or another type of dynamic or static storage device (e.g., a flash memory, a magnetic memory, and/or an optical memory) that stores information and/or instructions for use by the processor 720. For example, the memory 730 may include skC2P model 731.

The storage component 740 stores information and/or software related to the operation and use of the device 700. For example, the storage component 740 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The communication interface 750 includes a transceiver-like component (e.g., a transceiver and/or a separate receiver and transmitter) that enables the device 700 to communicate with other devices, such as via a wired connection, a wireless connection, or a combination of wired and wireless connections. The communication interface 750 may permit device 700 to receive information from another device and/or provide information to another device. For example, the communication interface 750 may include an Ethernet interface, an optical interface, a coaxial interface, an infrared interface, a radio frequency (RF) interface, a universal serial bus (USB) interface, a Wi-Fi interface, a cellular network interface, or the like.

The device 700 may perform one or more processes or operations described herein. The device 700 may perform operations based on the processor 720 executing software instructions stored by a non-transitory computer-readable medium, such as the memory 730 and/or the storage component 740. A computer-readable medium is defined herein as a non-transitory memory device. A memory device includes memory space within a single physical storage device or memory space spread across multiple physical storage devices.

Software instructions may be read into the memory 730 and/or the storage component 740 from another computer-readable medium or from another device via the communication interface 750. When executed, software instructions stored in the memory 730 and/or storage component 740 may cause the processor 720 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 7 are provided as an example. In practice, device 700 may include additional components, fewer components, different components, or differently arranged components than those shown in FIG. 7. Additionally, or alternatively, a set of components (e.g., one or more components) of device 700 may perform one or more operations described as being performed by another set of components of device 700.

In various embodiments of the present disclosure, any one of the operations or processes of FIGS. 1-6 may be implemented by or using any one of the elements illustrated in FIG. 7.

According to example embodiments, the device 700 may train a model to perform end-to-end C2P conversion and/or perform end-to-end C2P conversion on an input text in real-time. For instance, the device 700 may select labeled and unlabeled sentences from data sources to create a combined corpus, preprocess the combined corpus to obtain extracted linguistic features associated with the input text, generate mixed training data, based on the extracted linguistic features, to train a skC2P model to perform end-to-end C2P conversion. Additionally, or alternatively, the device 700 may receive a sequence of characters, perform end-to-end C2P conversion on the sequence of character using the skC2P model, and output a sequence of phonemes, that correspond to the input sequence of characters, in real-time.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the operations/acts specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operation/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the operations/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical operation(s). The method, computer system, and computer readable medium may include additional blocks, fewer blocks, different blocks, or differently arranged blocks than those depicted in the Figures. In some alternative implementations, the operations noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified operations or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method for training a model to perform end-to-end character-to-phoneme (C2P) conversion, performed by at least one processor and comprising:
   selecting, for a combined corpus of selected unlabeled and labeled sentences, a plurality of unlabeled sentences from a first data source wherein at least a predetermined minimum number of sentences are selected with respect to a target polyphone character;
   selecting, for the combined corpus, a plurality of labeled sentences from a second data source;
   preprocessing the combined corpus to extract a plurality of linguistic features;
   generating mixed training data by automatically labeling tokens in the preprocessed corpus based on the plurality of extracted linguistic features;
   further training a pre-trained model, using the mixed training data, to perform end-to-end C2P conversion, wherein the pre-trained model is configured to output a plurality of phoneme labels of a plurality of characters of a sentence that is input into the pre-trained model; and
   inputting a plurality of characters into the further trained model to obtain a plurality of phonemes corresponding to the plurality of characters.

2. The method of claim 1, wherein selecting the plurality of unlabeled sentences from the first data source comprises:
   selecting at least one sentence, from the plurality of unlabeled sentences, that includes a target polyphone character, for each of a plurality of target polyphone characters.

3. The method of claim 1, wherein selecting the plurality of unlabeled sentences from the first data source comprises:
   selecting a sentence, from the plurality of unlabeled sentences, only once for each of a plurality of target polyphone characters; and
   selecting at least a predetermined minimum number of sentences, from the plurality of unlabeled sentences, for each of the plurality of target polyphone characters.

4. The method of claim 1, wherein preprocessing the combined corpus of the selected unlabeled and labeled sentences to extract a plurality of linguistic features comprises:
   identifying one or more of a word boundary, part-of-speech (POS) tag, or named entity phrase using one or more linguistic tools; and
   extracting each identified word boundary, POS tag, or named entity phrase as a linguistic feature.

5. The method of claim 1, wherein preprocessing the combined corpus of the selected unlabeled and labeled sentences to extract a plurality of linguistic features comprises:
   identifying one or more tokens of the combined corpus that are associated with an extracted linguistic feature and a manually-labeled linguistic feature, wherein the extracted and manually-labeled linguistic features are mismatched; and
   masking the mismatched extracted linguistic feature associated with each of the one or more identified tokens.

6. The method of claim 1, wherein generating mixed training data by automatically labeling tokens in the preprocessed corpus based on the plurality of extracted linguistic features comprises:
   inputting the preprocessed corpus to a baseline system for automatic labeling, wherein the baseline system includes a plurality of rules and decision trees configured to label one or more tokens in the preprocessed corpus;
   obtaining a plurality of labeled tokens, output by the baseline system in response to inputting the preprocessed corpus, each token corresponding to a character in the preprocessed corpus, and each label corresponding to a phoneme associated with the character; and
   mixing the plurality of labeled tokens.

7. The method of claim 6, wherein mixing the plurality of labeled tokens comprises:
   identifying a mismatch among the plurality of labeled tokens, between an automatically generated label associated with a token and a manually assigned label associated with a token; and
   converting the mismatched automatically generated label to be consistent with the manually assigned label.

8. The method of claim 1, wherein training the pre-trained model, using the mixed training data, to perform end-to-end C2P conversion comprises:
   obtaining the pre-trained model that is previously trained to perform C2P conversion; and
   retraining the pre-trained model, using the mixed training data, to simultaneously label all characters in an input sentence when performing C2P conversion on the input sentence.

9. An electronic device comprising:
   at least one memory configured to store computer program code; and
   at least one processor configured to operate as instructed by the computer program code, the computer program code including:
      selecting code configured to cause the at least one processor to select, for a combined corpus of selected unlabeled and labeled sentences, a plurality of unlabeled sentences from a first data source wherein at least a predetermined minimum number of sentences are selected with respect to a target polyphone character, and select, for the combined corpus, a plurality of labeled sentences from a second data source,
      preprocessing code configured to cause the at least one processor to preprocess the combined corpus to extract a plurality of linguistic features,
      generating code configured to cause the at least one processor to generate mixed training data by automatically labeling tokens in the preprocessed corpus based on the plurality of extracted linguistic features,
      training code configured to cause the at least one processor to further train a pre-trained model, using the mixed training data, to perform end-to-end C2P conversion, wherein the pre-trained model is configured to output a plurality of phoneme labels of a plurality of characters of a sentence that is input into the pre-trained model; and inference code configured to cause the at least one processor to input a plurality of characters into the further trained model to obtain a plurality of phonemes corresponding to the plurality of characters.

10. The electronic device of claim 9, wherein the selecting code is configured to cause the at least one processor to:
   select a sentence, from the plurality of unlabeled sentences, only once for each of a plurality of target polyphone characters; and
   select at least a predetermined minimum number of sentences, from the plurality of unlabeled sentences, for each of the plurality of target polyphone characters.

11. The electronic device of claim 9, wherein the preprocessing code is configured to cause the at least one processor to:
   identify one or more of a word boundary, part-of-speech (POS) tag, or named entity phrase using one or more linguistic tools; and
   extract each identified word boundary, POS tag, or named entity phrase as a linguistic feature.

12. The electronic device of claim 9, wherein the generating code is configured to cause the at least one processor to:
   input the preprocessed corpus to a baseline system for automatic labeling, wherein the baseline system includes a plurality of rules and decision trees configured to label one or more tokens in the preprocessed corpus;
   obtain a plurality of labeled tokens, output by the baseline system in response to inputting the preprocessed corpus, each token corresponding to a character in the preprocessed corpus, and each label corresponding to a phoneme associated with the character; and
   mix the plurality of labeled tokens.

13. The electronic device of claim 9, wherein the training code is configured to cause the at least one processor to:
   obtain the pre-trained model that is previously trained to perform C2P conversion; and
   retrain the pre-trained model, using the mixed training data, to simultaneously label all characters in an input sentence when performing C2P conversion on the input sentence.

14. The electronic device of claim 9, wherein the computer program code includes conversion code configured to cause the at least one processor to perform end-to-end C2P conversion using the trained model trained on the mixed training data.

15. The electronic device of claim 14, wherein computer program code is further configured to cause the at least one processor to perform end-to-end C2P conversion in real-time, using the trained model, to output a sequence of phonemes corresponding to an input sequence of characters.

16. A non-transitory computer-readable recording medium having recorded thereon a computer program which, when executed by a processor, causes the processor to:
   select, for a combined corpus of selected unlabeled and labeled sentences, a plurality of unlabeled sentences from a first data source wherein at least a predetermined minimum number of sentences are selected with respect to a target polyphone character;
   select, for the combined corpus, a plurality of labeled sentences from a second data source;
   preprocess the combined corpus to extract a plurality of linguistic features;
   generate mixed training data by automatically labeling tokens in the preprocessed corpus based on the plurality of extracted linguistic features;
   further train a pre-trained model, using the mixed training data, to perform end-to-end C2P conversion, wherein the pre-trained model is configured to output a plurality of phoneme labels of a plurality of characters of a sentence that is input into the pre-trained model; and
   input a plurality of characters into the further trained model to obtain a plurality of phonemes corresponding to the plurality of characters.

* * * * *